United States Patent
Kuipers et al.

(10) Patent No.: US 6,731,038 B2
(45) Date of Patent: May 4, 2004

(54) BEARING-LIKE DEVICE USING MAGNETIC FORCE TO ACTIVELY AID OR ENHANCE TURNING OR SPINNING MOVEMENT

(76) Inventors: Charles Kuipers, 191 Jalyn Dr., New Holland, PA (US) 17557; Samuel Stoltzfus, 191 Jalyn Dr., New Holland, PA (US) 17557

(*) Notice: Subject to any disclaimer, the term of this patent is extended or adjusted under 35 U.S.C. 154(b) by 67 days.

(21) Appl. No.: 10/100,195

(22) Filed: Mar. 18, 2002

(65) Prior Publication Data

US 2003/0197439 A1 Oct. 23, 2003

(51) Int. Cl.⁷ .................. H02K 7/09; F16C 32/04; F16C 93/06
(52) U.S. Cl. .................. 310/90.5; 310/90; 310/66; 310/40 R
(58) Field of Search .................. 310/90, 90.5, 66, 310/40 R, 10

(56) References Cited

U.S. PATENT DOCUMENTS

| | | | | |
|---|---|---|---|---|
| 3,493,275 A | * | 2/1970 | Stone et al. | 310/90.5 |
| 3,512,851 A | * | 5/1970 | Love | 310/90.5 |
| 3,598,456 A | * | 8/1971 | Love | 310/90.5 |
| 4,037,887 A | * | 7/1977 | Germain | 384/193 |
| 4,065,188 A | * | 12/1977 | Ridler et al. | 310/90.5 |
| 4,095,855 A | * | 6/1978 | Fox | 384/109 |
| 4,320,927 A | * | 3/1982 | Sertich | 310/90.5 |
| 4,339,780 A | * | 7/1982 | Okubo | 361/147 |
| 4,379,598 A | * | 4/1983 | Goldowsky | 310/90.5 |
| 4,471,331 A | * | 9/1984 | Wyatt | 335/285 |
| 4,688,998 A | * | 8/1987 | Olsen et al. | 417/356 |
| 4,712,027 A | * | 12/1987 | Karidis | 310/12 |
| 4,734,606 A | * | 3/1988 | Hajec | 310/90.5 |
| 4,763,032 A | * | 8/1988 | Bramm et al. | 310/90.5 |
| 4,935,654 A | * | 6/1990 | Glass et al. | 310/90.5 |
| 4,956,571 A | * | 9/1990 | Gordon et al. | 310/90.5 |
| 5,079,458 A | * | 1/1992 | Schuster | 310/12 |
| 5,643,168 A | * | 7/1997 | Piramoon et al. | 494/16 |
| 5,675,199 A | * | 10/1997 | Miyakoshi et al. | 310/90 |
| 5,789,839 A | * | 8/1998 | Langenbeck | 310/90.5 |
| 5,801,464 A | * | 9/1998 | Brezoczky | 310/67 R |
| 5,883,453 A | * | 3/1999 | Choi | 310/90 |
| RE36,202 E | * | 4/1999 | Hajec | 310/90 |
| 5,952,752 A | * | 9/1999 | Kim | 310/90 |
| 6,020,664 A | * | 2/2000 | Liu et al. | 310/90 |
| 6,025,769 A | * | 2/2000 | Chu et al. | 335/216 |
| 6,127,756 A | * | 10/2000 | Iwaki et al. | 310/90 |
| 6,181,039 B1 | * | 1/2001 | Kennedy et al. | 310/90 |
| 6,182,336 B1 | * | 2/2001 | Bauer | 24/303 |
| 6,617,720 B1 | * | 9/2003 | Egan et al. | 310/67 R |
| 6,617,731 B1 | * | 9/2003 | Goodnick et al. | 310/90 |

FOREIGN PATENT DOCUMENTS

JP     05146109 A  *  6/1993  .......... H02K/5/167

* cited by examiner

Primary Examiner—Burton S. Mullins
Assistant Examiner—Pedro J Cuevas
(74) Attorney, Agent, or Firm—Gerhard P. Shipley

(57) ABSTRACT

A bearing-like device using magnetic force to both passively facilitate and actively aid or enhance a turning, spinning, or other movement of an attached shaft or other member. In a preferred embodiment, the device comprises a conical male component spirally wrapped in magnetic material outwardly presenting a magnetic pole of a particular orientation and received within a correspondingly shaped female component including magnetic material outwardly presenting a magnetic pole having the same particular orientation, such that the male component is both magnetically repelled from the female component and magnetically induced to turn or spin relative to the female component.

7 Claims, 2 Drawing Sheets

BEARING-LIKE DEVICE USING MAGNETIC FORCE TO ACTIVELY AID OR ENHANCE TURNING OR SPINNING MOVEMENT

BACKGROUND OF THE INVENTION

1. Field of the Invention

The present invention relates to bearings and other similar devices for passively facilitating and actively aiding or enhancing rotational or other movement. More particularly, the present invention concerns a bearing-like device using magnetic force to both passively facilitate and actively aid or enhance a turning, spinning, or other movement of an attached shaft or other member, wherein the device comprises a conical male component spirally wrapped in magnetic material outwardly presenting a magnetic pole of a particular orientation and received within a correspondingly shaped female component including magnetic material outwardly presenting a magnetic pole of the same particular orientation, such that the male component is both magnetically repelled apart from the female component and magnetically induced to turn or spin relative to the female component.

2. Description of the Prior Art

It is often desirable to facilitate turning or spinning or other similar movement in a shaft or other similar member. Typically, such movement is passively facilitated by reducing friction forces that oppose the movement. A simple well-known solution, for example, is to use a lubricant, such as oil or grease, to reduce friction forces arising from direct contact. Unfortunately, lubricants can break down or otherwise degrade, and can leak, and, furthermore, can become contaminated with particulate matter which decreases the lubricant's efficacy, thus requiring periodic replenishment or drainage and replacement.

Another more sophisticated solution is to use a bearing made of low friction material or a roller bearing, comprising a plurality of rollable cylinders or spheres, possibly in combination with a lubricant. Though such bearings are less prone than lubricants to degradation, they do wear over time and may seize under certain circumstances, necessitating replacement. Unfortunately, conventional bearings also require physical contact that gives rise to contact friction forces.

A newer but also well-known solution is to use a passive bearing based on principles of magnetic repulsion to suspend or "levitate" the shaft such that no physical contact is required, thereby eliminating contact friction forces. In these magnetic bearings, either the shaft itself or one or more magnets coupled with the shaft outwardly presents a magnetic pole of a particular orientation, whether north or south. The bearing also presents a magnetic pole having the same orientation such that the poles magnetically repel each other and the shaft is effectively repelled from the bearing. In a first configuration, for example, the magnetic bearing is substantially circular in shape and is positioned so as to surround the shaft, thereby forcing the shaft into a centered, annular, non-contact relationship with the bearing. This first configuration works well when the shaft is to assume a substantially horizontal orientation. In a second configuration, an end of the shaft is inserted into or otherwise received within the bearing, thereby forcing the shaft to levitate above the bearing, again, in a non-contact relationship. This second configuration works well when the shaft is to assume a substantially vertical orientation.

It will be appreciated, however, that the aforementioned mechanisms for facilitating turning or spinning are all merely passive in nature in that they do no more than reduce or eliminate some of the friction forces, particularly contact friction forces, that oppose the desired shaft motion. It will be appreciated, unfortunately, that these mechanisms are unable to actively aid the movement of the shaft. Actively aiding or enhancing movement of the shaft can be advantageous in many applications, such as, for example, power transfer, where such active aid can dramatically increase overall efficiency by overcoming or compensating for other forces, such as, for example, air resistance, resisting the shaft's movement.

Due to the above-described and other problems and disadvantages in the prior art, a need exists for an improved bearing.

SUMMARY OF THE INVENTION

The present invention provides a distinct advance in the art of bearings and other similar devices for passively facilitating and actively aiding or enhancing rotational or other movement. More particularly, the present invention provides a bearing-like device using magnetic force to both passively facilitate and actively aid or enhance a turning, spinning, or other movement of an attached shaft or other member.

In a preferred embodiment, the device broadly comprises a male component and a female component. The male component is operable to turn or spin due to magnetic interaction with the substantially stationary female component. The male component includes a male body and a first magnetic component. The male body is operable to support the first magnetic component in its proper position and orientation. The male body is shaped substantially similar to a truncated cone having an approximately 33.33° taper, and is constructed from a non-magnetic material, such as, for example, wood, plastic, or aluminum, or any other suitable material. Furthermore, as desired or required, the male body may be substantially solid or may provide only a shell or skeletal framework for supporting the first magnetic component.

The first magnetic component may be constructed of any suitable substantially permanently magnetic material, such as, for example, magnetized neodymium boron carbon #30, presenting a north pole and a south pole. The first magnetic component wraps spirally, at an approximately 6° angle and with a counterclockwise or left-hand twist, approximately 180° about the conically-shaped male body so as to outwardly present a first magnetic pole of a particular orientation, whether north or south.

The female component is operable to remain stationary and, through magnetic interaction, cause the male component to turn or spin. The female component includes a female body and a second magnetic component. The female body is operable to support the second magnetic component in its proper position and orientation. The female body presents a conical recess, having a 22.50° taper, which substantially corresponds to and is operable to receive the male component, and is constructed from a non-magnetic material, such as, for example, wood, plastic, or aluminum, or any other suitable material.

The second magnetic component may be constructed of any suitable substantially permanently magnetic material, such as, for example, magnetized neodymium boron carbon #30, presenting a north pole and a south pole. The second magnetic component includes three distinct portions or rows, including a lower row; a central row; and an upper row. The lower row circumferentially surrounds a portion of the recess and, being attached to a surface thereof, is inclined at a substantially identical 22.50°. The central row resides on a protruding flange or lip which is attached to and circumferentially surrounds a portion of the recess at a point between the lower and upper rows near a top of the recess, and is inclined at 67.50°. The top row circumferentially surrounds the top of the recess and lies substantially flat, giving it an inclination of 90.00°. Each of the three rows of the second magnetic component present toward the interior of the recess a second magnetic pole of the same orientation, north or south, as the first magnetic pole of the first magnetic component.

In use and operation, the bearing-like device of the present invention may be used, for example, to passively facilitate and actively aid or enhance the clockwise turning motion of the aforementioned shaft or other member which couples a turbine with an electricity generator so as to transfer power therebetween. The male component is partially inserted into the female recess of the female component so that the first pole of the first magnetic component is exposed to the second pole of the second magnetic component so as to repel one another. Due in part to the 6° counterclockwise spiral of the first magnetic component, the magnetic forces between the first and second magnetic components cause the male component to turn clockwise, thereby actively aiding the turning movement of the shaft.

Thus, it will be appreciated that the bearing-like device of the present invention provides substantial advantages over prior art bearings and similar devices. In particular, the present invention is operable both to passively facilitate and actively aid or enhance the turning motion of the attached shaft or other member. Passive facilitation results from magnetic repulsion along an axis of the motion, which physically separates the male component from the female component and substantially reduces or eliminates friction forces due to physical contact. Active facilitation results from torque about the axis of motion due to the shape, configuration, positioning, and magnetic interaction of the male component and the female component. Thus, while prior art bearings and similar devices are limited to passive facilitation, generally involving merely reducing or eliminating friction forces, the present invention also functions to actively aid and enhance the turning or spinning movement.

These and other important aspects of the present invention are more fully described in the section entitled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
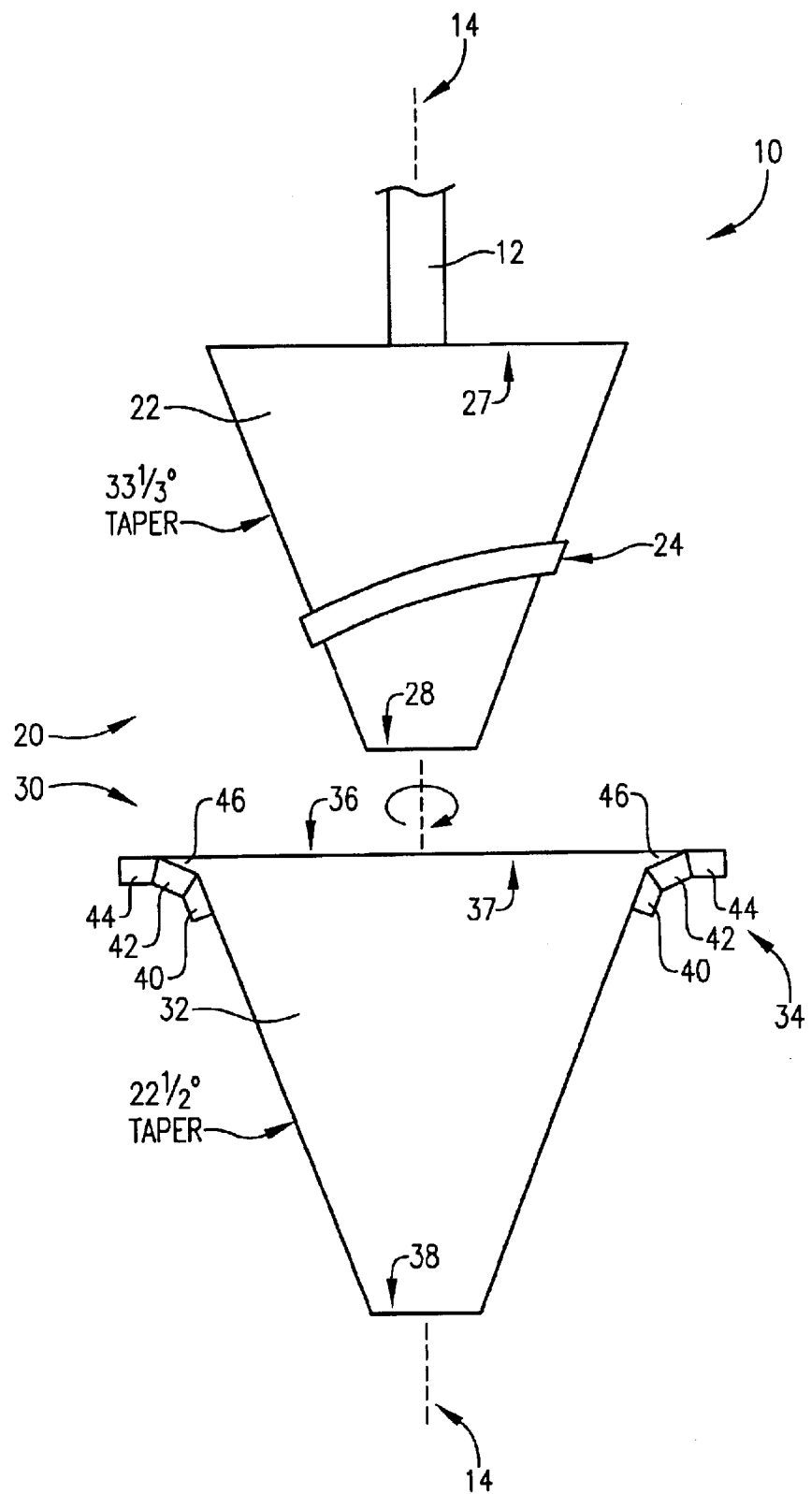
FIG. 1 is an exploded isometric sectional view of a preferred embodiment of the present invention.

Referring to FIG. 1, a bearing-like device 10 is shown constructed in accordance with a preferred embodiment of the present invention. The device 10 is operable to use magnetic force to both passively facilitate and actively aid or enhance a turning, spinning, or other movement of an attached shaft 12 or other member. It should be noted that, as used herein, the term "turning" denotes circular movement of less than one complete 360° revolution; whereas the term "spinning" denotes circular movement of at least one complete 360° revolution.

In a preferred embodiment, the device 10 broadly comprises a male component 20 and a female component 30. The shaft 12 and the male and female components 20,30 of the device 10 define and share an axis of motion 14 about which the turning or spinning movement occurs.

In the illustrated embodiment, the male component 20 is operable to turn or spin due to magnetic interaction with the substantially stationary female component 30. In an alternative embodiment, however, the male component 20 remains substantially stationary and the female component 30 turns or spins relative thereto. The male component 20 includes a male body 22 and a first magnetic component 24. The male body 22 is operable to support the first magnetic component 24 in its proper position and orientation. The male body 22 is shaped substantially similar to a truncated cone having an approximately 33.33° external taper, and is constructed from a non-magnetic material, such as, for example, wood, plastic, or aluminum, or any other suitable material. Furthermore, as desired or required, the male body 22 may be substantially solid or may provide only a shell or skeletal framework for supporting the first magnetic component 24. Additionally, though the device 10 may be made to different sizes, as illustrated and described herein the male body 22 is approximately eight inches in length and tapers at 33.33° from a top 27 which is eight inches in diameter to a truncated bottom 28 which is two inches in diameter.

The first magnetic component 24 may be constructed of any suitable substantially permanently magnetic material, such as, for example, magnetized neodymium boron carbon #30, presenting a north pole and a south pole. As illustrated, the first magnetic component 24 includes a plurality of rectangular magnets, each being approximately 0.5 inches wide, 0.75 inches long, and 0.25 inches thick, placed end-to-end or otherwise adjacently arranged so as to wrap spirally, at an approximately 6° angle and with a counterclockwise or left-hand twist, approximately 180° about the conically-shaped male body 22. Alternatively, other types and embodiments of magnetic material, such as, for example, a single long flexible piece of magnetic material, may be used in place of and in a manner similar to the aforementioned plurality of individual magnets.

Where the male body 22 is solid, a groove may be cut thereinto for accommodating attachment of the first magnetic component 24. Alternatively, the first magnetic component 24 may be attached to or incorporated into the male body 22 in any suitable manner and using any suitable mechanism. Regardless of how it is attached, the first magnetic component 24 outwardly presents a first magnetic pole of a particular orientation, whether north or south.

In the illustrated embodiment, the female component 30 is operable to remain stationary and, through magnetic interaction, cause the male component 20 to turn or spin. In an alternative embodiment, the female component 30 turns or spins while the male component 20 remains substantially stationary. The female component 30 includes a female body 32 and a second magnetic component 34. The female body 32 is operable to support the second magnetic component 34 in its proper position and orientation. The female body 32 presents a recess 36 which substantially corresponds to and is operable to receive the male component 20, and is constructed from a nonmagnetic material, such as, for example, wood, plastic, or aluminum, or any other suitable material. Furthermore, as desired or required, the female body 32 may be substantially solid or may provide only a shell or skeletal framework for supporting the second magnetic component 34. Additionally, though the device 10 may be made to different sizes, as illustrated and described herein the recess 36 is approximately nine inches deep and tapers at 22.50° along most of its length from an open top 37 which is nine inches in diameter to a bottom 38 which is two inches in diameter.

The second magnetic component 34 may be constructed of any suitable permanently magnetic material, such as, for example, magnetized neodymium boron carbon #30, presenting a north pole and a south pole. As illustrated, the second magnetic component 34 includes a plurality of rectangular magnets, each being approximately 0.5 inches wide, 0.75 inches long, and 0.25 inches thick, placed end-to-end or otherwise adjacently arranged. Alternatively, other types and embodiments of magnetic material, such as, for example, a single long flexible piece of magnetic material, may be used in place of and in a manner similar to the aforementioned plurality of individual magnets.

The second magnetic component 34 includes three distinct portions or rows, including a lower row 40; a central row 42; and an upper row 44. The lower row 40 circumferentially surrounds the recess 36 and, being attached to a surface thereof, is inclined at a substantially identical 22.50° to the axis of motion 14. The central row 42 resides on a protruding flange 46 or lip which is attached to and circumferentially surrounds the recess 36 near its top 37 and at a point between the lower and upper rows 40,44, and is inclined at 67.50° relative to the axis of motion 14. The top row 44 circumferentially surrounds the top 27 of the recess 36 and lies substantially flat, giving it an inclination of 90.00° relative to the axis of motion 14.

The three rows 40,42,44 of the second magnetic component 34 may be attached to or incorporated into the female body 32 in any suitable manner and using any suitable mechanism. Regardless of how they are attached, however, each of the three rows 40,43,44 of the second magnetic component 34 present toward the interior of the recess 36 a second magnetic pole of the same orientation, north or south, as the first magnetic pole of the first magnetic component 24.

Figure 2:
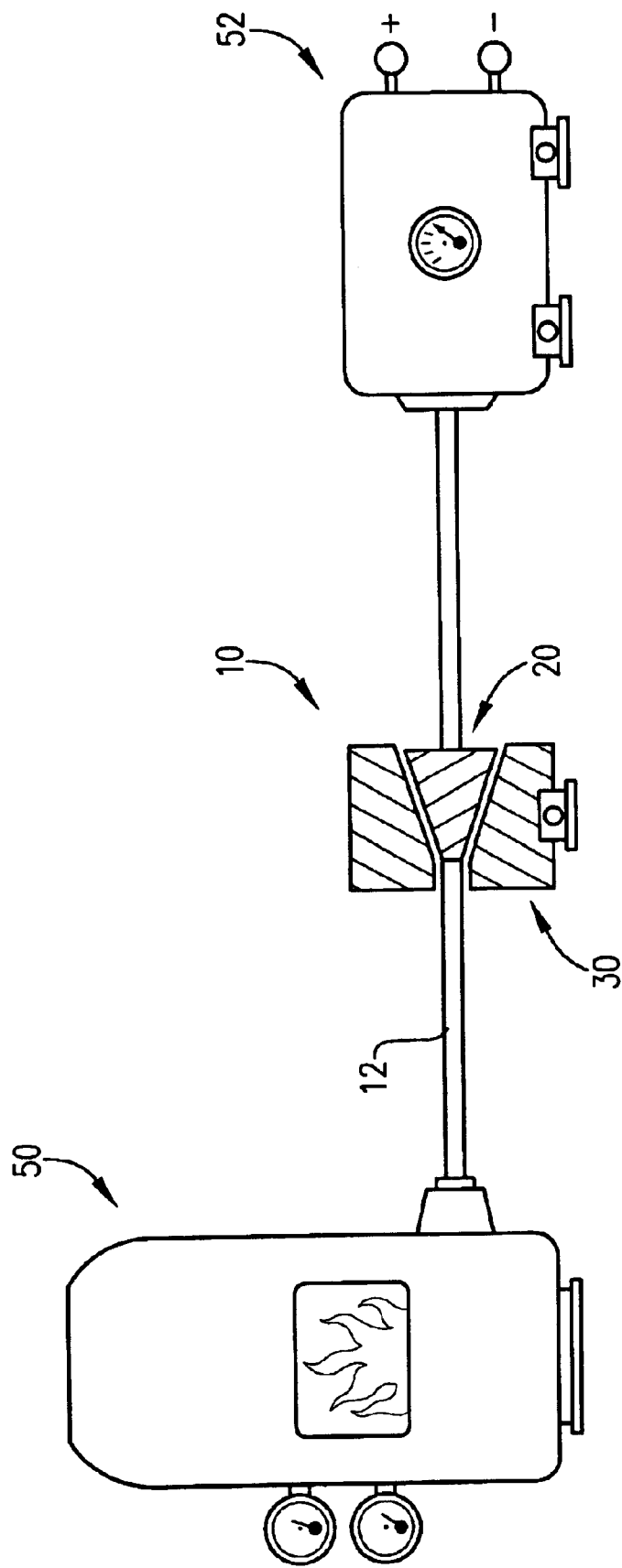
FIG. 2 is a depiction of the preferred embodiment of the present invention in an exemplary use.

In use and operation, referring also to FIG. 2, the device 10 may be used, for example, to passively facilitate and actively aid or enhance the clockwise turning motion of the aforementioned shaft 12 which operatively couples a turbine 50 with an electricity generator 52 to transfer power therebetween. The male component 20 is partially inserted into the female recess 36 of the female component 30 so that the first pole of the first magnetic component 24 is exposed to the second pole of the second magnetic component 34 so as to repel one another. Due in part to the 6° counterclockwise spiral of the first magnetic component 24, the magnetic forces between the first and second magnetic components 24,34 cause the male component 20 to turn clockwise, thereby actively aiding the turning movement of the shaft 12.

From the preceding description, it will be appreciated that the device 10 of the present invention provides substantial advantages over prior art bearings and similar devices. In particular, the present invention is operable both to passively facilitate and actively aid or enhance the turning motion of the attached shaft 12 or other member. Passive facilitation results from magnetic repulsion along the axis of motion 14, which physically separates the male component 20 from the female component 30 and substantially reduces or eliminates friction forces due to physical contact. Active facilitation results from torque about the axis of motion 14 due to the shape, configuration, positioning, and magnetic interaction of the male component 20 and the female component 30. Thus, while prior art bearings and similar devices are limited to passive facilitation, generally involving merely reducing or eliminating some friction forces, particularly contact friction forces, the present invention also functions to actively aid and enhance the turning or spinning movement.

Although the present invention has been described with reference to the preferred embodiment illustrated in the attached drawings, it is noted that equivalents may be employed and substitutions made herein without departing from the scope of the invention as recited in the claims. Thus, for example, though described herein as passively facilitating and actively aiding or enhancing the turning or spinning movement of a shaft or similar member, such as may be used, for example, in a power transfer application, the present invention may be readily adapted for use in many different applications involving turning, spinning, or other movement.

Having thus described the preferred embodiment of the invention, what is claimed as new and desired to be protected by Letters Patent includes the following:

1. A device using magnetic force to actively aid a movement of a member attached to the device, the device comprising:
    a male component having a first magnetic component, wherein the first magnetic component is arranged in a tapering spiral and presents a first magnetic pole of a particular orientation; and
    a female component having a second magnetic component including—
        a lower circumferential row of magnetic material oriented at 22.50° relative to an axis of movement defined by the male component and the female component,
        a central circumferential row of magnetic material oriented at approximately 67.50° relative to the axis of movement, and
        an upper circumferential row of magnetic material oriented at 90.00° relative to the axis of movement,
    wherein the second magnetic component is arranged circumferentially around at least a portion of the mate component and presents a second magnetic pole of the same particular orientation, such that the first magnetic component and the second magnetic component magnetically interact so as to both repel and turn, thereby actively aiding the movement of the attached member.

2. The device as set forth in claim 1, wherein the lower row includes a first single length of a flexible magnetic material, the central row includes a second single length of the flexible magnetic material, and the upper row includes a third single length of the flexible magnetic material.

3. A device using magnetic force to actively aid a movement of a member attached to the device, the device comprising:
    a male component including—
        a conical body having a 33.33° external taper, and
        a first magnetic component wrapped spirally, at a 6° angle, 180° about the conical body and presenting a first magnetic pole of a particular orientation; and
    a female component including—
        a conical recess having a 22.50° internal taper and operable to receive at least a portion of the male component, and a second magnetic component arranged about the conical recess and including—
  a lower circumferential row of magnetic material oriented at 22.50° relative to an axis of movement defined by the male component and the female component,
  a central circumferential row of magnetic material oriented at 67.50° relative to the axis of movement, and
  an upper circumferential row of magnetic material oriented at 90.00° relative to the axis of movement,
wherein the second magnetic component is arranged circumferentially around at least a portion of the male component and the second magnetic component presents a second magnetic pole of the same particular orientation, such that the first magnetic component and the second magnetic component magnetically interact so as to both repel and turn, thereby actively aiding the movement of the attached member.

4. The device as set forth in claim 3, wherein the first magnetic component and the second magnetic component are constructed of permanently magnetized neodymium boron carbon #30.

5. The device as set forth in claim 3, wherein the first magnetic component includes a first plurality of adjacently arranged individual magnets, and the second magnetic component includes a second plurality of adjacently arranged individual magnets.

6. The device as set forth in claim 3, wherein the first magnetic component includes a single length of a flexible magnetic material.

7. The device as set forth in claim 3, wherein the lower row includes a first single length of a flexible magnetic material, the central row includes a second single length of the flexible magnetic material, and the upper row includes a third single length of the flexible magnetic material.

* * * * *